May 15, 1923. Re. 15,607

A. VALLOT

DEVICE FOR MOUNTING HEADLIGHTS ON THE BODIES OF MOTOR CARS

Original Filed Sept. 22, 1913 2 Sheets-Sheet 1

Inventor
André Vallot,
Lloyd W. Batch
his Attorney

May 15, 1923. Re. 15,607

A. VALLOT

DEVICE FOR MOUNTING HEADLIGHTS ON THE BODIES OF MOTOR CARS

Original Filed Sept. 22, 1913 2 Sheets-Sheet 2

Inventor
André Vallot
Lloyd W. Patch
his Attorney

Reissued May 15, 1923. Re. 15,607

UNITED STATES PATENT OFFICE.

ANDRÉ VALLOT, OF LEVALLOIS-PERRET, FRANCE, ASSIGNOR, BY DIRECT AND MESNE ASSIGNMENTS, OF ONE-HALF TO HERBERT E. VANDERVEER, OF PUEBLO, COLORADO, AND ONE-HALF TO A. K. McRAE, OF DENVER, COLORADO.

DEVICE FOR MOUNTING HEADLIGHTS ON THE BODIES OF MOTOR CARS.

Original No. 1,408,149, dated February 28, 1922, Serial No. 791,094, filed September 22, 1913. Application for reissue filed July 25, 1922. Serial No. 577,479.

*To all whom it may concern:*

Be it known that I, ANDRÉ VALLOT, a citizen of the French Republic, residing at Levallois-Perret, in the Republic of France, have invented certain new and useful Improvements in a Device for Mounting Headlights on the Bodies of Motor Cars (for which I have filed applications in France, February 20, 1913, Patent No. 455,129, and England, September 27, 1913, Patent No. 21,837), of which the following is a specification.

This invention relates to a device for mounting headlights on the bodies of motor cars, said device being adapted besides to serve for mounting any other articles and not only on the bodies of cars but on any other objects having an outer contour curved or of double curvature.

This device has for its object not only the mounting of the headlights on points of the body of the car where it is very difficult to mount them, specially on the curved parts of the torpedo frames, but also a mounting to permit shifting of said headlights in a plurality of directions within sufficiently wide limits after the manner of the eye in its orbit so that, according to requirement, the driving mechanism can be lighted, or a sign-post or other object upon the road, and the road itself can be lighted.

In the accompanying drawings the invention is shown:—

Figure 1:
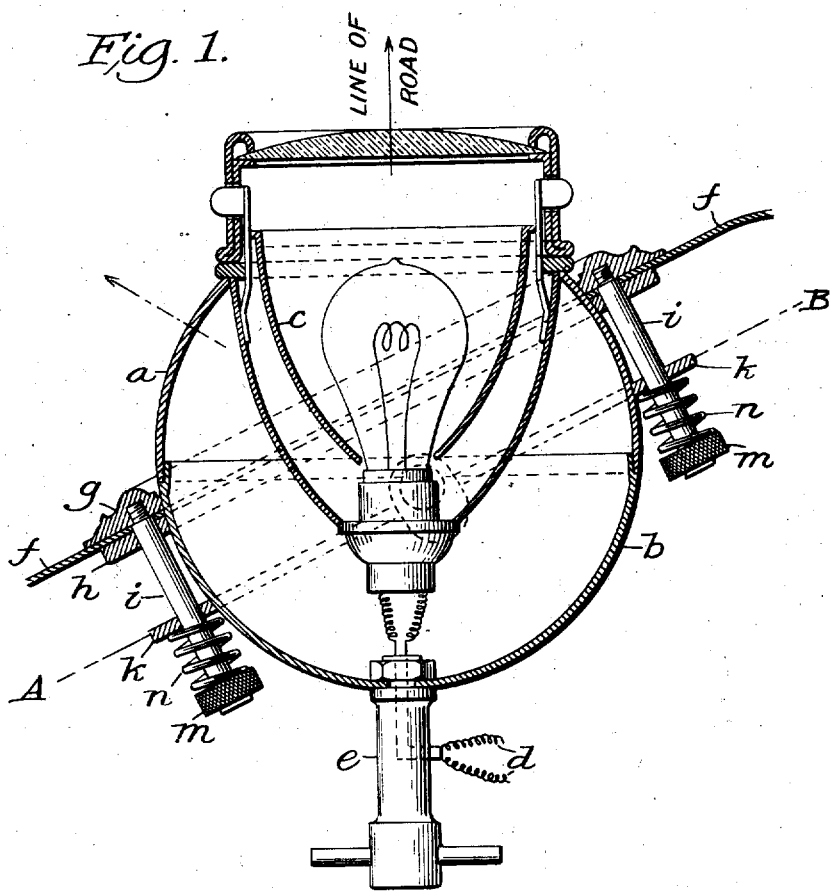
Figure 1 is a horizontal section.

The mounting apparatus essentially consists of a hollow sphere forming ball joint constructed in any appropriate manner. In the drawings this sphere is shown as being composed of two hemispheres *a* and *b* obtained by pressing a piece of sheet metal and connected the one with the other by welding along a diametric plane. In this sphere the headlight *c* is mounted and it is connected with the sphere in any appropriate manner. In the form of construction shown by way of example an electric light is represented as mounted in the headlight, the conducting wires *d* of which are conducted into the sphere through a handle *e* fixed upon the sphere at a point which is opposite the point where the headlight is arranged and conveniently hollowed for the passage of the conducting wires.

In order to mount the sphere *a*, *b*, on the curved body *f*, a circular aperture is cut in this body having a diameter slightly shorter than that of the sphere. The edges of this aperture can be reinforced for example by means of two rings *g* and *h* arranged on either side of the edges of the aperture and connected with one another by a number of threaded studs *i* screwed into the outer ring *g*. The sphere *a*, *b*, is inserted from the lower side of the body into the aperture thus cut out and it is covered with a ring *k* the diameter of which is slightly shorter than the diameter of the sphere and which has holes corresponding with the studs *i*. Between the ring *k* and the heads *m* of the studs weak springs *n* are arranged designed to press the ring *k* upon the sphere *a*—*b* and consequently to mount this sphere on the car body *f*.

It is easy to understand that the headlight thus mounted on the car body can be moved in any direction by manipulation of the handle *e* and by turning the sphere *a*—*b* within its mounting.

Fig. 1 shows the left hand side headlight of the car in the normal position, that is to say its axis being directed according to the road indicated by the arrow, this position is at the same time the end position of the headlight towards the inner side of the car, but it can be directed towards the outside until its axis registers with the arrow shown in dotted lines so that the foot path of the road can be lighted, and as at the same time the headlight can be lifted or lowered it is possible to light either the road or a sign post placed at the side of the road.

In bringing the headlight back to the normal position, the light rays are directed in the direction of the road. An indicating device can be provided which at the same time serves for fixing the sphere *a*—*b* in this position.

Figure 2:
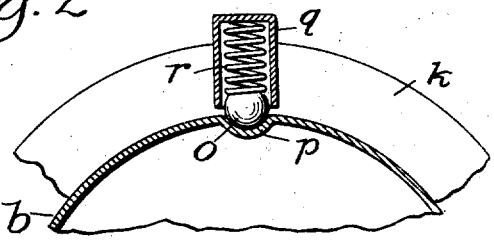
Fig. 2 is a section on lines A—B of Fig. 1.

Fig. 2 shows by way of example a fixing device adapted for this purpose. It consists of a small cavity *p* made in the hemisphere *b* and designed to receive a ball *o* located in a tube *q* which is arranged radially and carried by the ring *k*. In this tube a spring *r* is arranged which pushes the ball *o* into the cavity *p*. The sphere *a—b* is brought to approximately the normal position and is further moved till the ball seats in the cavity *p*. It is evident that any other device could be used for the same purpose.

Figure 3:
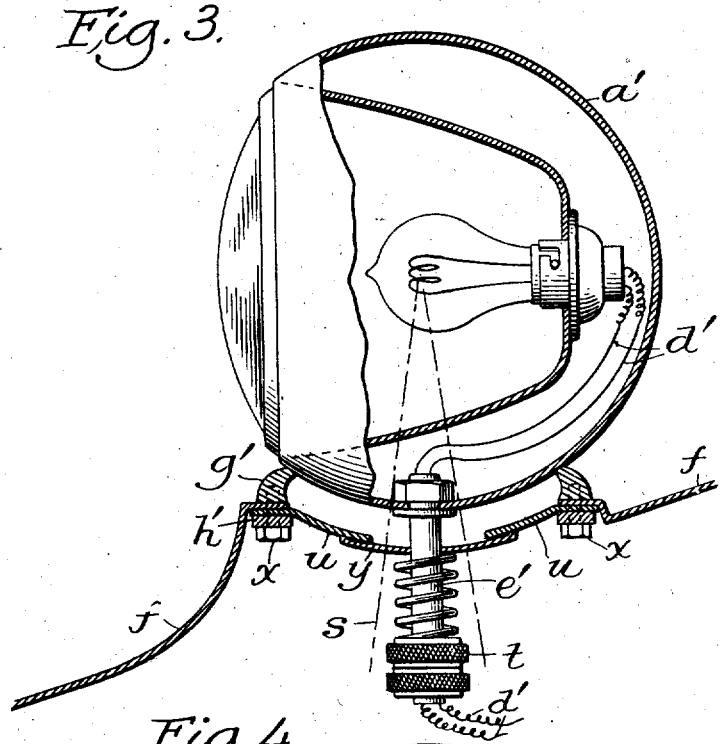
Figs. 3 and 4 show another form of construction.
Figure 4:
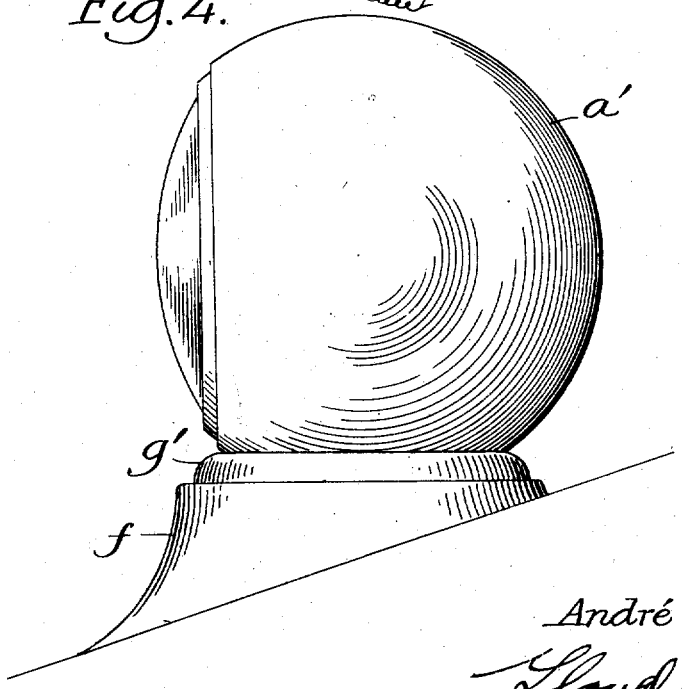

Figs. 3 and 4 show in vertical section and in elevation a device designed to be placed preferably at the middle of the bonnet of the car.

According to this form of construction the sphere *a'*, instead of being clamped in between two rings arranged on either side of its diametral plane, is mounted only by one ring *g'* fixed on the car body *f* and it is maintained against this ring through the action of one spring *s* surrounding the handle *e'* and bearing on the one hand against the milled head *t* of this handle and, on the other hand, against the car body. With this object in view it is necessary to restrict the aperture made in the car body *f* as a passage for the handle *e'*. To obtain this, a collar *u* is arranged between the two rings *g'* and *h'* which is maintained in position by the screws *x* which fix the rings *g'* and *h'* on the bonnet *f*. This collar has a central opening which limits the oscillations of the handle *e'*. Between the spring *s* and the collar *u* a washer *y* is arranged which is slightly larger than the opening at the centre of the collar *u* and which moves with the handle *e'*. The spring *s* bears against this washer which itself bears against the collar *u*. The electric wires *d'* which supply the current for the headlights pass through the handle *e'* as has been hereinbefore described, said handle having been conveniently hollowed for this purpose.

As can be seen, the difference between the two forms of construction consists in the following: In the first form of construction the greatest part of the sphere is located under the bonnet whilst in the second form of construction, the sphere is situated completely outside the bonnet. In the first case the springs push the sphere outward, in the second case the spring pulls the sphere inward.

The mounting by ball or knuckle-joint according to this invention permits of mounting the headlights upon the car body like the eye is held in the orbit; this mounting is perfect and it permits movement of the headlights in all directions to a sufficient degree.

Having thus described my invention what I claim is:—

1. A headlight mounting for motor cars or the like, comprising a partially spherical casing for the headlight, a ring of less diameter than said spherical casing carried by the car, means frictionally supporting said casing against said ring and means extending inward from the inner portion of said casing by which the latter may be angularly displaced by hand in any direction from the interior of the car.

2. A head-light mounting for motor cars or the like, comprising a spherical headlight casing, a pair of rings one fixed and one movable between which the casing is engaged, springs for pressing the movable ring against the casing, and a lever extending from the rear of the casing to afford means for manual angular displacement of the light from the interior of the car.

3. A head-light mounting for motor cars or the like, comprising a spherical head-light casing, a ring support through which the front of said casing projects, frictional engaging means for holding said casing against said ring support, and means on the rear of the casing by which said casing may be displaced in any angular position.

4. A head-light mounting for motor cars or the like, comprising a spherical head light casing, peripheral supporting means therefor of less diameter than the axial diameter of the spherical casing and frictionally engaging the latter on opposite sides of its said diameter, in combination with means on the rear of the casing by which the latter may be displaced in any angular direction.

5. In a headlight mounting for motor cars a substantially spherical supporting and bearing member, a headlight carried by said member, a ring of less diameter than said spherical member carried by the car, means frictionally supporting said member against said ring, and means extending inward from said spherical member by which the headlight may be angularly displaced by hand in any direction from the interior of the car.

6. In a headlight mounting for motor cars, a partially spherical member, a headlight carried by said member, a ring of less diameter than said spherical member carried by the car, a second ring also of less diameter than the spherical member, spring means for clamping the spherical member between said rings, and means extending inwardly from said spherical member by which the same may be moved by hand to angularly displace the headlight casing in any direction from the interior of the car.

7. In a headlight mounting for motor cars, a substantially spherical member, a headlight carried by said member, a ring support mounted on a portion of the car structure through which the headlight projects, frictional engaging means for holding said spherical member against said ring support, and means extending rearwardly from said spherical member by which said headlight may be displaced in any angular direction.

8. In a headlight mounting for motor cars, a substantially spherical supporting and mounting member, a ring carried on a portion of the car, a movable ring associated with the first mentioned ring, said spherical member being movably supported by said rings, spring means pressing the movable ring against the spherical member, a headlight carried by the spherical member having its light emitting portion on the outer side of the ring, and a handle on the inner side of the spherical member for manual angular displacement of the headlight from the interior of the car.

9. In combination with the upper portion of a vehicle having an opening therethrough, a headlight, a dirigible mounting for said headlight in said opening, the head light having a light emitting portion on one side of said portion of the vehicle, and operating means on the other side.

10. In a headlight for motor cars, a bearing ring to be mounted around an opening in the car, a substantially spherical bearing and supporting member mounted in conjunction with the ring, a second ring associated with the first ring and frictionally engaging with the bearing member, a headlight structure carried by the spherical member with its light-emitting portion on the outer side of the ring, and a handle associated with the bearing member on the inner side to shift the light angularly.

11. In a headlight for motor vehicles, a ring to be fixedly mounted on an upper portion of the vehicle having an opening therethrough, a bearing ring associated with said fixed ring, a substantially spherical supporting and bearing member of greater diameter than the inside diameter of said bearing ring fitted thereagainst, a second ring movably fitted against the spherical bearing member, resilient means urging said second ring to bear frictionally against the spherical member, a headlight carried by said supporting and bearing member with its light-emitting portion on the outer side of the rings, and a handle extending from said spherical member on the inner side of the rings.

12. In combination a support having an opening therethrough and a headlight device mounted for universal movement in said opening having a light emitting portion located on one side, a handle located on the other side of the support, and means for resiliently retaining the head light in the desired position of adjustment.

13. In combination a supporting member having an opening therethrough, a bearing applied to the supporting member at said opening, and a headlight device mounted for universal movement in said bearing having a light-emitting portion on one side and a handle on the other side of the supporting member.

14. In combination a support having an opening therethrough, a headlight, a handle, and a supporting member connecting the headlight and handle mounted for universal movement within the opening to present the light-emitting portion on one side of the support and the handle on the other.

15. In combination a supporting member having an opening therethrough, a bearing portion provided with means to engage the marginal edges of the supporting member about said opening, a headlight, a handle and a member connecting the headlight and handle and mounted for universal movement within the bearing portion.

16. In combination a supporting member having an opening therethrough, a bearing secured to the supporting member at said opening, a light-supporting member movably mounted in said bearing, a headlight connected and movable with said last-named member and having a light-emitting portion on one side of the supporting member, a manipulating handle connected with the movable member and located on the other side of the supporting member, the said movable member being mounted in the bearing and connected with the headlight and handle to permit universal adjustment of the headlight through the medium of the handle.

17. The combination with the upper portion of a vehicle having an opening therethrough, of a bearing attached to the vehicle at said opening, a spherical bearing member mounted in said bearing for substantially universal adjustment, a light-projecting device carried by said bearing member and positioned to cast its rays on one side of the said vehicle portion, and a handle connected with the said bearing member and located on the opposite side of said vehicle portion.

18. The combination with the upper portion of a vehicle having an opening therethrough, of a bearing attached to the vehicle at said opening, a spherical bearing member mounted in said bearing for substantially universal adjustment, the bearing having a yieldable portion for frictionally engaging the bearing member to retain it in the desired position of adjustment, a light projecting device carried by said bearing member and positioned to cast its rays on one side of said vehicle portion, and a handle connected with the said bearing member and located on the opposite side of the said vehicle portion.

In testimony whereof I affix my signature.

ANDRÉ VALLOT.